Feb. 14, 1939.    H. LEYBURN    2,147,101
ELECTRIC PROTECTIVE ARRANGEMENT
Filed April 26, 1937
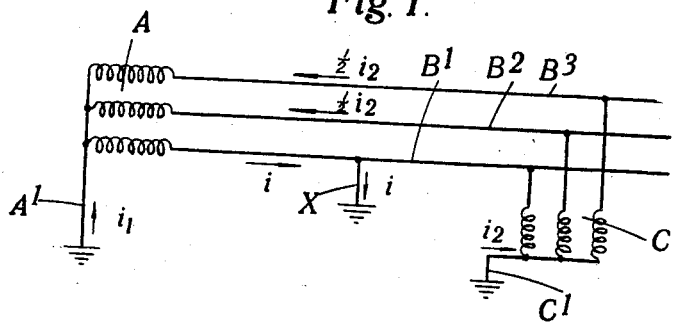
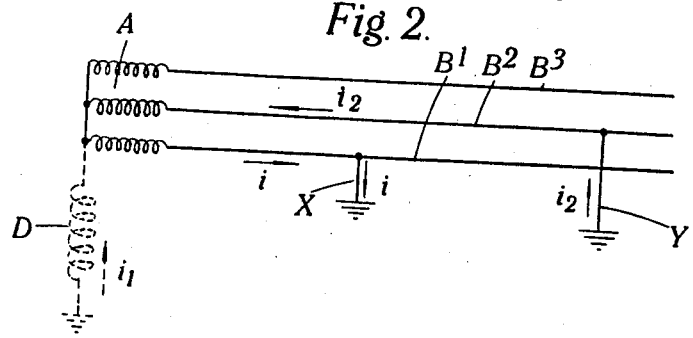
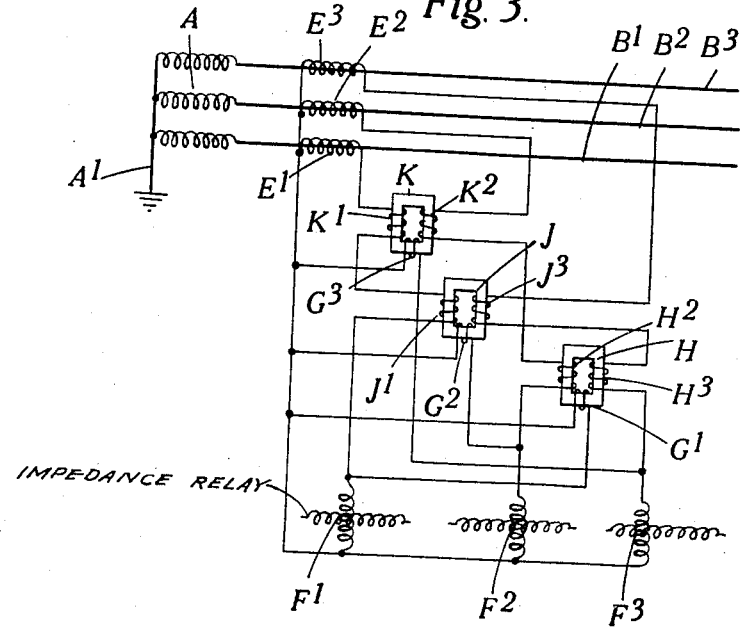

Patented Feb. 14, 1939

2,147,101

UNITED STATES PATENT OFFICE 2,147,101

ELECTRIC PROTECTIVE ARRANGEMENT

Henry Leyburn, Newcastle-upon-Tyne, England, assignor to A. Reyrolle & Company Limited, Hebburn-on-Tyne, England, a British company Application April 26, 1937, Serial No. 139,097
In Great Britain May 6, 1936

5 Claims. (Cl. 175—294)

This invention relates to electric protective arrangements of the distance type for polyhase circuits, that is to arrangements in which the operation depends upon measurement of the impedance or the reactance or other characteristic ratio of the fault loop representative of the distance of the fault from the measuring apparatus.

When arrangements of this type are applied to the protection of a multiple-earthed network, or in certain circumstances (for example on the occurrence of a double earth fault) when they are employed on a network earthed at one point only or having its neutral point insulated from earth or connected to earth through an arc extinguishing coil, a difficulty arises owing to the fact that currents flowing as the result of the fault in phases other than those on which the measurement is being obtained cause the measuring apparatus to give an incorrect measurement of the fault distance. The measurement is made on the faulty phase in the case of a single earth fault on a multiple-earthed network, and in one of the faulty phases in the case of a double earth fault on a multiple-earthed or other network, but in each case the current flowing in the other phases will cause an error in the measurement of the fault distance, as will be made clear from an examination of Figure 1 of the accompanying drawing, which illustrates the conditions arising on the occurrence of a single earth fault on a three-phase multiple-earthed network. In this figure A represents a generator or power transformer, whose neutral point is earthed at $A^1$, supplying the network $B^1B^2B^3$, to which one or more power transformers are connected, the primary of one transformer being indicated at C with its neutral point earthed at $C^1$. In the event of a single earth fault, say at X on the phase $B^1$, the total fault current $i$ flowing from the power transformer A along the faulty phase to the fault X divides itself into two (or more) parts, one of which $i_1$ constituting the leakage current returns directly through the neutral earthing connection $A^1$ at the generating station, whilst the other $i_2$ (or each other) passes through earth to another earthed point $C^1$ of the network and thence returns to the generating station through the healthy phases $B^2B^3$, equally divided between them. If the impedance (or reactance) of one phase to earth is $Z_1$ and that between two phases is $Z_2$, the total voltage drop in the faulty section of the line included in the fault loop becomes $i_1Z_1+i_2Z_2$ or $iZ_1-i_2(Z_1-Z_2)$. The fault loop comprises that portion of the circuit from the terminal of the power transformer A through the portion of the feeder traversed by the current $i$, the fault itself, and back through earth to the terminal of the transformer. The voltage drop expressed by $i_1Z_1+i_2Z_2$ obtains only in the section of the feeder included in the fault loop, i. e., from the transformer primary to the ground fault X. The expression then indicates the derivation of the voltage drop as being the summation of the drops caused by the return of a portion of the fault current $i$ to ground from X to $A'$, this amount of current being represented by $i_1$, and the current $i_2$ returning by way of the two healthy phases. The effect of the current component $i_2$ is to induce a voltage in the faulty phase $B'$ which results in an error in the impedance measurement based upon the voltage drop along the faulty phase. The component $i_1$ of the fault current traverses the fault loop comprising the faulty phase $B'$, the fault X to earth and thence via the neutral connection $A'$ back to the transformer A. This current produces a voltage drop along the faulty phase which is dependent upon the line-to-earth impedance. The other component $i_2$ traverses a circuit parallel to the fault loop and including the faulty phase $B'$ up to the fault X, then through ground to $C'$, the transformer C to the two healthy phases and back through the transformer A to the faulty phase $B'$. The total voltage drop along the faulty phase $B'$ is therefore the sum of the two components $i_1Z_1+i_2Z_2$.

It will be appreciated that for a given fault current $i$, the earth fault impedance or reactance of the line on the bases of such fault current is proportional to the voltage drop given by this expression. The limiting conditions are reached on the one hand where the neutral of the transformer A is isolated, when the fault current returns entirely through the healthy phases $B^2B^3$ half through each, that is when $i=i_2$, when the voltage drop becomes $iZ_2$, and on the other hand when the current in either healthy phase $B^2$ or $B^3$ is equal to and in the same direction as that in the faulty phase $B^1$, that is when $i_2=-2i$, when the voltage drop becomes $i(3Z_1-2Z_2)$, which corresponds to the zero phase sequence impedance. The uncompensated basic voltage drop, which corresponds to that for a dead-ended feeder or a feeder in a network earthed at one point only, is $iZ_1$, which lies between the minimum and maximum values $iZ_2$ and $i(3Z_1-2Z_2)$.

Somewhat analogous conditions arise also in the case of a double earth fault on a network, which is either completely insulated from earth or is earthed at one point only for example through an arc-extinguishing coil. Figure 2 of the accompanying drawing illustrates the example of a network $B^1B^2B^3$ fed from a generator or power transformer A, whose neutral point is either insulated from earth or is earthed through an arc-extinguishing coil shown in dotted line at D. If two earth faults occur on such a network, say at X on phase $B^1$ and at Y on phase $B^2$, a measurement of the fault impedance or reactance would indicate a fault position somewhere between the two points X and Y, and such measurement would be valueless if the points happen to be distant from one another. Thus the fault current $i$ flowing through the phase $B^1$ to the fault X, if the power transformer neutral point is earthed, would divide itself into two parts $i_1$ and $i_2$ flowing respectively through the neutral earthing connection and through the second earth fault Y, or, if the network is completely insulated from earth, would return through the second fault Y and the phase $B^2$ ($i_2$ being equal to $i$ and $i_1$ being zero).

Hitherto compensation for the error due to the current flow in the healthy phases of a multiple-earthed network has been obtained by connecting the measuring apparatus in the phase leads of the current transformer secondary circuit and injecting into the apparatus a current proportional to the residual or earth leakage component $i_1$ of the current obtained from the neutral earth circuit of the current transformer secondaries. This method of compensation is not, however, wholly satisfactory for three reasons, namely (a) that the relays must be set to operate at the minimum impedance value and the compensation arranged to increase the setting to correspond to the actual impedance, thus involving in practice an amount of compensation comparable with the setting value of the relays, (b) that it is found in practice that the neutral earth circuit of the current transformer secondaries does not accurately reflect the true residual current owing to the shunting effect of the secondaries on the healthy phases, this effect becoming especially marked when six current transformers per feeder are used as is often the case, and (c) that the compensating component is always added to the actual setting value, which must be chosen at a minimum figure which never occurs in practice.

The present invention has for its object to provide compensation for the error due to the current flow in the phases other than that on which the measurement is being made, wherein such disadvantages are obviated.

In the arrangement according to the invention the desired compensation is obtained by injecting into the measuring apparatus in the faulty phase on which the measurement is being obtained current proportional to that flowing in the other phases. Thus the arrangement may comprise earth-fault measuring apparatus for each phase energised in accordance with the current flowing in such phase, and means associated with each measuring apparatus whereby in the event of an earth fault on the corresponding phase a current proportional to the sum of the currents flowing in the other phases is injected into the measuring apparatus in order to compensate for the error in measurement due to earth-fault current flowing in such other phases. Conveniently the compensating current injected into the measuring apparatus is obtained from the secondary winding of a transformer having primary windings respectively energised in accordance with the currents flowing in the other phases.

A preferred arrangement according to the invention for a three-phase network is illustrated diagrammatically in Figure 3 of the accompanying drawing, wherein the network $B^1B^2B^3$ (which will for convenience of description be assumed to be a multiple-earthed network) is fed from a generator or power transformer A earthed at $A^1$. In this arrangement a current transformer $E^1$ or $E^2$ or $E^3$ is provided on each phase at the relay station, the secondaries of the three current transformers being star-connected in the usual manner. In each current transformer secondary phase lead is connected the current coil $F^1$ or $F^2$ or $F^3$ of an earth fault relay of the "distance" type, for example a relay which operates its contacts after a time dependent on the reactance or impedance of the line. Across the current coil $F^1$ or $F^2$ or $F^3$ of each relay is connected the secondary winding $G^1$ or $G^2$ or $G^3$ of a compensating transformer H or J or K having two primary windings $H^2H^3$ or $J^3J^1$ or $K^1K^2$, which are respectively connected in series in the current transformer secondary phase leads in the other two phases. The two primary windings $H^2H^3$ (or $J^3J^1$ or $K^1K^2$) on each compensating transformer H (or J or K) have the same numbers of turns and are wound so that their effects on the secondary winding $G^1$ (or $G^2$ or $G^3$) are additive. The turns ratio in each compensating transformer is $(Z_1-Z_2)/Z_1$, the secondary winding $G^1$ (or $G^2$ or $G^3$) being connected to the relay coil $F^1$ (or $F^2$ or $F^3$) in a sense to oppose the flow of current therein, when the fault current in the healthy phases is flowing in the opposite direction to that in the faulty phase. Thus the resultant current acting on the relay is $$i_1+i_2-\frac{i_2(Z_1-Z_2)}{Z_1}$$

that is $(i_1Z_1+i_2Z_2)/Z_1$, and since the voltage drop measured by the voltage coil of the relay will be $(i_1Z_1+i_2Z_2)$, it will be clear that the compensated relay will operate in accordance with the true impedance or reactance value $Z_1$ instead of with the value $(i_1Z_1+i_2Z_2)/(i_1+i_2)$.

With this arrangement the relays would be set to operate at the natural value, i. e., the value for an open-ended line, as they usually are in uncompensated distance protective arrangements, and the compensation, which in practice will be small, will only be effective when earth-fault current is actually flowing in the healthy phases and will be up or down as the case may be, in contrast with the prior known compensating arrangements in which the relays are set at a fictitious minimum value with a relatively large compensating current acting to raise this value. Moreover the location of the compensating transformers in the current transformer phase leads prevents the shunting effect which gives rise to errors in the known arrangement. Since the setting value of the compensated relay is identical with that usually employed in uncompensated systems, the arrangement according to the invention readily lends itself to application to existing uncompensated systems.

It will be appreciated that the above arrangement although described for use on a multiple-earthed network is equally applicable to other networks, in which case it will act to afford compensation for the errors of measurement which occur in the event of a double earth fault.

What I claim as my invention and desire to secure by Letters Patent is:

1. In an electric protective arrangement of the distance type for polyphase circuits, the combination of earth-fault responsive apparatus for measuring a characteristic ratio of the fault loop representative of the distance of the fault from the apparatus, and means for compensating for the error in measurement due to earth-fault current flowing in phases other than that on which the measurement is being obtained comprising means whereby current proportional to that flowing in such other phases is injected into the measuring apparatus.

2. In an electric protective arrangement of the distance type for polyphase circuits, the combination of earth-fault responsive apparatus for each phase energized in accordance with the current flowing in such phase and adapted in the event of a fault on the phase to measure a characteristic ratio of the fault loop representative of the distance of the fault from the apparatus, and compensating means associated with each measuring apparatus whereby a current proportional to the sum of the currents flowing in the other phases is injected into the measuring apparatus.

3. In an electric protective arrangement of the distance type for polyphase circuits, the combination of earth-fault responsive apparatus for measuring a characteristic ratio of the fault loop representative of the distance of the fault from the apparatus, and means for compensating for the error in measurement due to earth-fault current flowing in phases other than that on which the measurement is being obtained comprising a transformer having primary windings respectively energized in accordance with the currents flowing in such other phases and a secondary winding connected to the measuring apparatus whereby a current proportional to the sum of those flowing in the other phases is injected into the measuring apparatus.

4. In an electric protective arrangement of the distance type for polyphase circuits, the combination of earth-fault responsive apparatus for each phase adapted in the event of a fault on such phase to measure a characteristic ratio of the fault loop representative of the distance of the fault from the apparatus and having a current coil energized in accordance with the current flowing in the phase, and a compensating transformer associated with each measuring apparatus having a secondary winding connected to the current coil of the associated apparatus and primary windings respectively energized in accordance with the currents flowing in the other phases whereby a compensating current proportional to the sum of those flowing in such other phases is injected into the measuring apparatus.

5. In an electric protective arrangement of the distance type for three-phase circuits, the combination of a current transformer in each phase of the protected circuit, earth-fault responsive apparatus for each phase adapted in the event of a fault on such phase to measure a characteristic ratio of the fault loop representative of the distance of the fault from the apparatus and having a current coil energized from the current transformer in the associated phase, and a transformer associated with each measuring apparatus having a secondary winding connected across the current coil thereof and two primary windings respectively energized from the current transformers in the phases other than that of the associated measuring apparatus whereby a current proportional to the sum of the currents in such other phases is injected into the measuring apparatus to compensate for the error in measurement due to earth-fault current flow in such other phases.

HENRY LEYBURN.